United States Patent
Po

(10) Patent No.: US 11,497,046 B2
(45) Date of Patent: Nov. 8, 2022

(54) COMMUNICATION DEVICE SCHEDULING METHOD, SCHEDULING SERVER, METHOD FOR REPORTING DATA AND COMMUNICATION DEVICE

(71) Applicants: ACER BEING COMMUNICATION INC., Taipei (TW); Acer Incorporated, New Taipei (TW)

(72) Inventor: Chan-Ping Po, Taipei (TW)

(73) Assignees: ACER BEING COMMUNICATION INC., Taipei (TW); Acer Incorporated, New Taipei (TW)

( * ) Notice: Subject to any disclaimer, the term of this patent is extended or adjusted under 35 U.S.C. 154(b) by 155 days.

(21) Appl. No.: 17/005,320

(22) Filed: Aug. 28, 2020

(65) Prior Publication Data

US 2022/0070905 A1    Mar. 3, 2022

(51) Int. Cl.
*H04W 72/12* (2009.01)

(52) U.S. Cl.
CPC .............................. *H04W 72/1278* (2013.01)

(58) Field of Classification Search
CPC ................................................ H04W 72/1278
See application file for complete search history.

(56) References Cited

U.S. PATENT DOCUMENTS

| | | | |
|---|---|---|---|
| 2014/0293968 A1* | 10/2014 | Ebrahimi Tazeh Mahalleh .......... | H04W 56/002 370/336 |
| 2015/0006633 A1 | 1/2015 | Vandwalle et al. | |
| 2018/0139762 A1 | 5/2018 | Cho et al. | |
| 2018/0288224 A1* | 10/2018 | Dizengof ................ | H04W 4/90 |
| 2020/0066126 A1* | 2/2020 | Voor ....................... | G08B 17/08 |

FOREIGN PATENT DOCUMENTS

| | | |
|---|---|---|
| CN | 106797643 | 5/2017 |
| WO | 2009013277 | 1/2009 |

OTHER PUBLICATIONS

Husam Rajab et al., "IoT scheduling for higher throughput and lower transmission power", Wireless Networks, Mar. 23, 2020, pp. 1-14.
"Search Report of Europe Counterpart Application", dated Feb. 11, 2021, p. 1-p. 8.

* cited by examiner

*Primary Examiner* — Duc C Ho
(74) *Attorney, Agent, or Firm* — JCIPRNET

(57) ABSTRACT

The disclosure provides a communication device scheduling method, a scheduling server, a method for reporting data, and a communication device. The communication device scheduling method includes: assigning a first transmission time, a second transmission time, and a first scheduling channel to the communication device to control the communication device to respectively transmit first data and second data at the first transmission time and the second transmission time by using the first scheduling channel; in response to receiving the first data at a first receiving time, calculating a first time offset according to the first receiving time; and adjusting the second transmission time based on the first time offset to control the first communication device to transmit the second data by using the first scheduling channel at the adjusted second transmission time.

16 Claims, 4 Drawing Sheets

```
┌─────────────────────────────────────────────────────┐
│ assigning a first transmission time, a second       │
│ transmission time, and a first scheduling channel   │
│ to a communication device to control the            │
│ communication device to respectively transmit       │
│ first data and second data at the first             │
│ transmission time and the second transmission       │
│ time by using the first scheduling channel   S210   │
└─────────────────────────────────────────────────────┘
                          │
                          ▼
┌─────────────────────────────────────────────────────┐
│ in response to receiving the first data at a first  │
│ receiving time, calculating a first time offset     │
│ according to the first receiving time   S220        │
└─────────────────────────────────────────────────────┘
                          │
                          ▼
┌─────────────────────────────────────────────────────┐
│ adjusting the second transmission time based on     │
│ the first time offset to control the communication  │
│ device to transmit the second data by using the     │
│ first scheduling channel at the adjusted second     │
│ transmission time                                   │
│                      S230                           │
└─────────────────────────────────────────────────────┘
```

COMMUNICATION DEVICE SCHEDULING METHOD, SCHEDULING SERVER, METHOD FOR REPORTING DATA AND COMMUNICATION DEVICE

BACKGROUND

Technical Field

The disclosure relates to a scheduling method, a server, a method for reporting data, and a communication device, and in particular, to a communication device scheduling method, a scheduling server, a method for reporting data, and a communication device.

Description of Related Art

As technology advances and time passes, technology related to the Internet of Things (IoT) has gain increasing attention. In IoT, some communication devices are not required to transmit large amounts of data but need connection methods requiring low power consumption to maintain operation for a long period of time, and the low-power wide-area network (LPWAN) such as the long range wide area network (LoRaWAN) thereby emerges. LoRaWAN combines three major features including low power consumption, low costs, and long transmission distance and may meet the needs of IoT applications that require operation for a long period time, battery-powered power supply, and large-scale deployment. As a result, LoRaWAN quickly gains popularity among telecom operators and begins to be used in the infrastructure construction of smart cities and smart industries.

In LoRaWAN, when the state of the communication device changes (such as detecting a specific event), a request may be sent to the host. Nevertheless, if two communication devices send data to the host at the same frequency band at the same time, since the host may receive data from only one communication device at a time and may not receive multiple pieces of data at the same time, these pieces of data may collide and data loss may thus occur. The above situation may not only occur among communication devices but may also occur in the host. When the host sends a downstream data stream to the communication device, if other devices also use the same frequency band to send data, collision may occur in the host as well.

For the communication device, if the acknowledging message from the host is not received for a long time, the communication device may continue to try to retransmit. Nevertheless, such action may not only cause the bandwidth to be occupied, but also lead to a higher chance of collision with other communication devices.

SUMMARY

Accordingly, the disclosure provides a communication device scheduling method, a scheduling server, a method for reporting data, and a communication device which may be configured for solving the above technical problems.

The disclosure provides a communication device scheduling method suitable for a scheduling server for managing a plurality of communication devices, and the method includes the following steps. A first transmission time, a second transmission time, and a first scheduling channel are assigned to a first communication device among the communication devices to control the first communication device to respectively transmit first data and second data at the first transmission time and the second transmission time by using the first scheduling channel. In response to receiving the first data at a first receiving time, a first time offset is calculated according to the first receiving time. The second transmission time is adjusted based on the first time offset to control the first communication device to transmit the second data by using the first scheduling channel at the adjusted second transmission time.

The disclosure provides a scheduling server including a storage circuit, a transceiver, and a processor. The storage circuit stores a plurality of modules. The processor is coupled to the storage circuit and the transceiver and accesses the modules to execute the following steps. The transceiver is controlled to assign a first transmission time, a second transmission time, and a first scheduling channel to a first communication device among the communication devices to control the first communication device to respectively transmit first data and second data at the first transmission time and the second transmission time by using the first scheduling channel. In response to the transceiver receiving the first data at a first receiving time, a first time offset is calculated according to the first receiving time. The second transmission time is adjusted based on the first time offset, and the transceiver is controlled to request the first communication device to transmit the second data by using the first scheduling channel at the adjusted second transmission time.

The disclosure provides a method for reporting data, suitable for a communication device managed by a scheduling server, and the method includes the following steps. A first transmission time, a second transmission time, and a first scheduling channel assigned by the scheduling server are received from the scheduling server. First data is transmitted to the scheduling server at the first transmission time by using the first scheduling channel. The adjusted second transmission time is received from the scheduling server. Second data is transmitted at the adjusted second transmission time by using the first scheduling channel.

The disclosure provides a communication device including storage circuit, a transceiver, and a processor. The storage circuit stores a plurality of modules. The processor is coupled to the storage circuit and the transceiver and accesses the modules to execute the following steps. A first transmission time, a second transmission time, and a first scheduling channel assigned by a scheduling server are received from the scheduling server. The transceiver is controlled to transmit first data to the scheduling server at the first transmission time by using the first scheduling channel. The adjusted second transmission time is received from the scheduling server. The transceiver is controlled to transmit second data at the adjusted second transmission time by using the first scheduling channel.

To sum up, the scheduling server provided by the disclosure assigns different scheduling channels and/or transmission times to different communication devices and may control the communication devices to adjust the following transmission time according to the time offset of the received data, such that synchronization is achieved between the scheduling server and the communication devices, and collision is accurately prevented.

To make the aforementioned more comprehensible, several embodiments accompanied with drawings are described in detail as follows.

DESCRIPTION OF THE EMBODIMENTS

Figure 1:
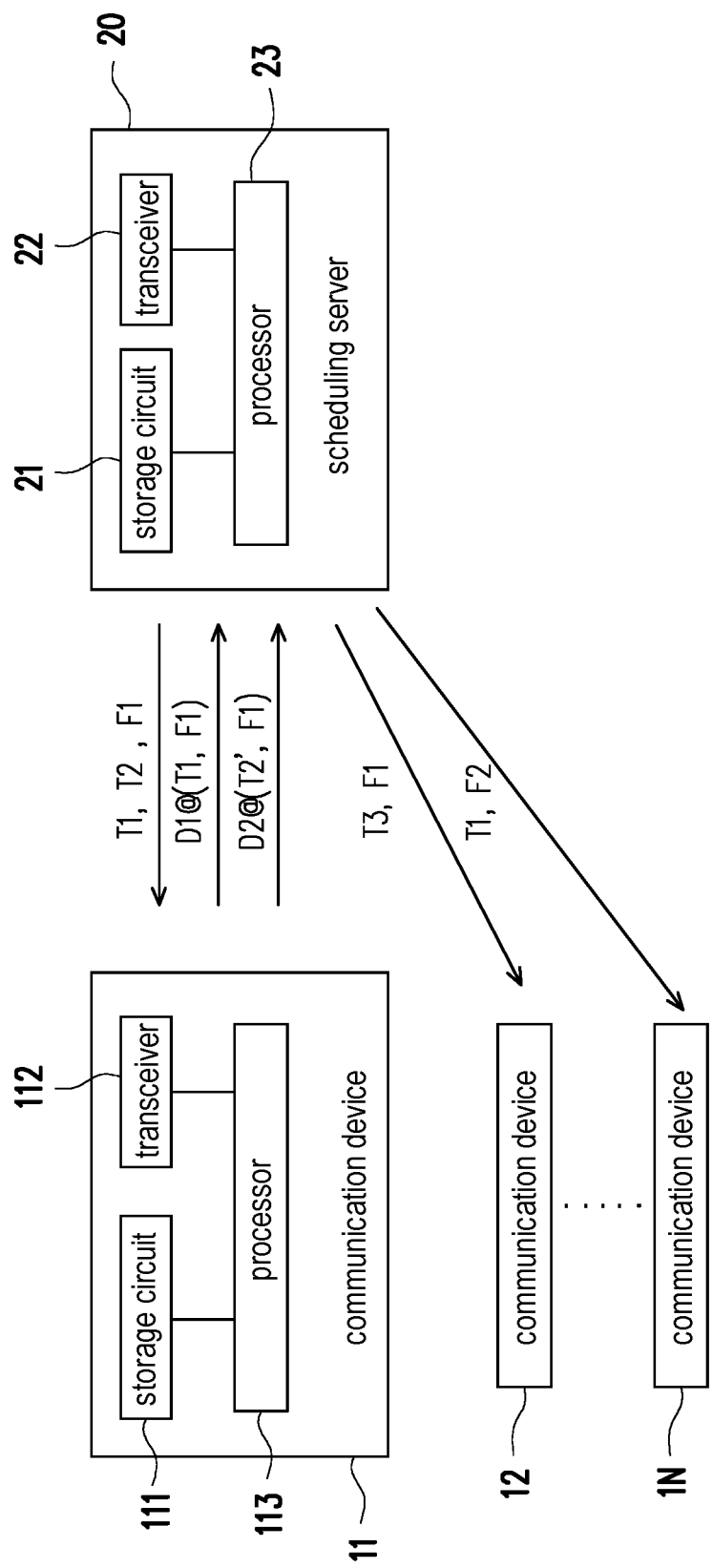
FIG. 1 is a schematic view illustrating a scheduling server and communication devices according to an embodiment of the disclosure.

With reference to FIG. 1, which is a schematic view illustrating a scheduling server and communication devices according to an embodiment of the disclosure. In FIG. 1, communication devices 11, 12, ..., and 1N may be Internet of Things (IoT) devices, and a scheduling server 20 may be used for managing the communication devices 11 to 1N, for example. For instance, the communication devices 11 to 1N may be smoke detectors, gas detectors, temperature detectors, or other similar IoT devices and may be used to report specific events (such as fire, temperature, etc.) to a scheduling server 20 when these events are detected.

Generally, in the embodiments provided by the disclosure, different from the conventional method of allowing IoT devices to report events through random access, the scheduling server 20 provided by the disclosure may arrange different scheduling channels and/or transmission times for the communication devices 11 to 1N, such that the communication devices 11 to 1N are prevented from collision during reporting, and probability of data loss may thereby be reduced. Related details are provided in detail in following paragraphs.

In FIG. 1, architectures of the communication devices 11 to 1N are approximately identical, and scheduling performed by the scheduling server 20 on the communication devices 11 to 1N is similar as well, so the following description is provided merely based on interaction between the communication device 11 and the scheduling server 20, and interactions between the communication devices 12 to 1N and the scheduling server 20 may be deduced by a person of ordinary skill in the art based on related teachings.

As shown in FIG. 1, the communication device 11 includes a storage circuit 111, a transceiver 112, and a processor 113. The storage circuit 111 is a fixed or a movable random access memory (RAM) in any form, a read-only memory (ROM), a flash memory, a hard disc, other similar devices, or a combination of the foregoing devices, for example, and may be used to record a plurality of program codes or modules. In different embodiments, the program codes and modules in the storage circuit 111 may be accessed by the processor 113 to accomplish a method provided by the disclosure.

The transceiver 112 may be a component of a protocol unit, for example, and supports signal transmission performed through the global system for mobile communication (GSM), personal handy-phone system (PHS), code division multiple access (CDMA) system, wireless fidelity (Wi-Fi) system, or worldwide interoperability for microwave access (WiMAX).

The transceiver 112 provides wireless access for the communication device 11 in FIG. 11 through the following, at least including a transmitter circuit, a receiver circuit, an analog-to-digital (A/D) converter, a digital-to-analog (D/A) converter, a low noise amplifier (LNA), a mixer, a filter, a matching circuit, a transmission line, a power amplifier (PA), one or a plurality of antenna units, and a local storage media component, but is not limited thereto.

The receiver circuit may include a functional unit to perform operations such as low noise amplification, impedance matching, frequency mixing, down frequency conversion, filtering, and amplification. The transmitter circuit may include a functional unit to perform operations such as amplification, impedance matching, frequency mixing, up frequency conversion, filtering, and amplification. The A/D converter or the D/A converter are configured to convert an analog signal format to a digital signal format during upstream signal processing and to convert the digital signal format to the analog signal format during downstream signal processing.

The processor 113 is coupled to the storage circuit 111 and the transceiver 112 and may be a processor for general use, a processor for special use, a traditional processor, a digital signal processor, a plurality of microprocessors, one or a plurality of microprocessors combined with a digital signal processor core, a controller, a microcontroller, an application specific integrated circuit (ASIC), a field programmable gate array (FPGA) circuit, any other types of integrated circuits, a state machine, a processor based on an advanced RISC machine (ARM), and the like.

In addition, as shown in FIG. 1, the scheduling server 20 includes a storage circuit 21, a transceiver 22, and a processor 23, and implementations thereof may be found with reference to related description of the storage circuit 111, the transceiver 112, and the processor 113 and thus are not repeated herein.

Figure 2:
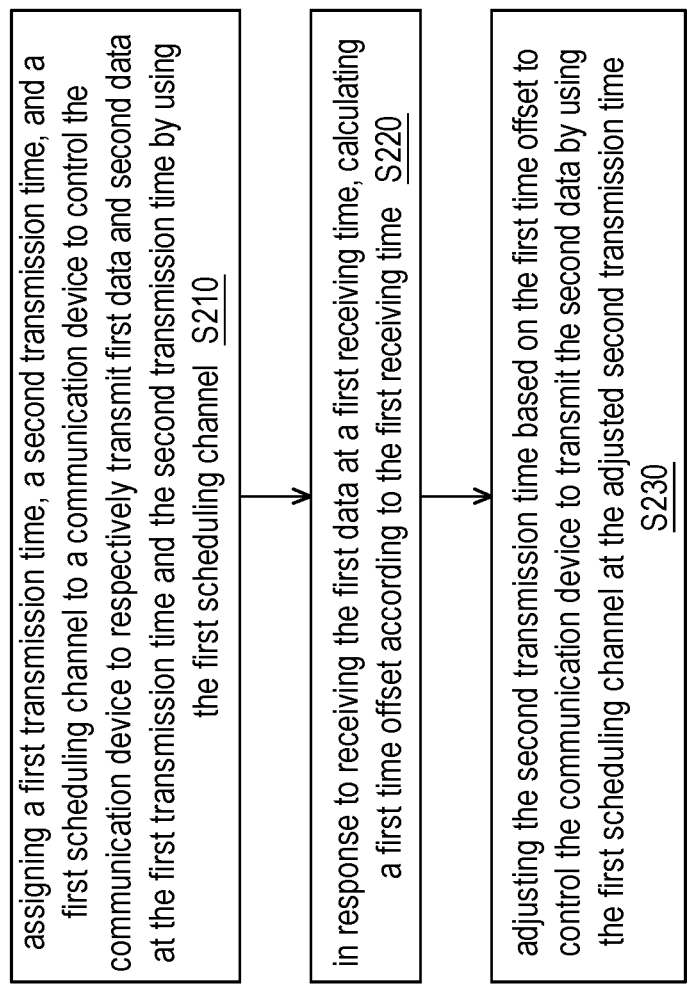
FIG. 2 is a flow chart illustrating a communication device scheduling method according to an embodiment of the disclosure.

With reference to FIG. 2, which is a flow chart illustrating a communication device scheduling method according to an embodiment of the disclosure. The method provided by this embodiment may be executed by the scheduling server 20 provided in FIG. 1, and each step provided in FIG. 2 is described in detail together with the elements provided in FIG. 1.

First, in step S210, the processor 23 of the scheduling server 20 may assign a first transmission time T1, a second transmission time T2, and a first scheduling channel F1 to the communication device 11 to control the communication device 11 to respectively transmit first data D1 and second data D2 at the first transmission time T1 and the second transmission time T2 by using the first scheduling channel F1.

Correspondingly, the processor 113 of the communication device 11 may receive the first transmission time T1, the second transmission time T2, and the first scheduling channel F1 assigned by the scheduling server 20 from the scheduling server 20. Next, the processor 113 of the communication device 11 may control the transceiver 112 to transmit the first data D1 to the scheduling server 20 at the first transmission time T1 by using the first scheduling channel F1. In different embodiments, the first data D1 is, for example, a specific event detected by the communication device 11, and the communication device 11 may transmit the first data D1 to the scheduling server 20 at the first transmission time T1.

In addition, the second data D2 is, for example another event detected after the first data D1, and the communication device 11 may choose to transmit the second data D2 to the scheduling server 20 at the second transmission time T2 according to assignment of the scheduling server 20, where the second transmission time T2 occurs after the first transmission time T1.

As described in the foregoing embodiments, the scheduling server 20 may assign different scheduling channels and/or transmission times to different communication devices, such that the communication devices are prevented from colliding with one another. It thus can be seen that when the communication device 11 transmits the first data D1 at the first transmission time T1 by using the first scheduling channel F1, no other communication devices also perform transmission at the first transmission time T1 by using the first scheduling channel F1.

Nevertheless, if accurate synchronization between the communication device 11 and the scheduling server 20 is not achieved, even though the communication device 11 transmits the first data D1 at the first transmission time T1 according to an instruction, the scheduling server 20 may not receive the first data D1 at a predetermined time point. When the scheduling server 20 receives the first data D1 at a first receiving time, since data transmitted by another communication device may at the same time reach the scheduling server 20 at such first receiving time, collision may thus occur. Therefore, steps S220 and S230 are provided in the disclosure to prevent the above situation from occurring.

To be specific, in step S220, in response to receiving the first data D1 at the first receiving time, the processor 23 of the scheduling server 20 may calculate a first time offset according to the first receiving time. In this embodiment, if the scheduling server 20 estimates that the first data D1 is to be received at a specific estimation time (e.g., the first transmission time T1), the processor 23 may calculate the first time offset by subtracting the estimation time from the first receiving time, that is, how late before the scheduling server 20 receives the first data D1, but the disclosure is not limited thereto.

Next, in step S230, the processor 23 may adjust the second transmission time T2 based on the first time offset to control the first communication device 11 to transmit the second data D2 by using the first scheduling channel F1 at an adjusted second transmission time T2'. In an embodiment, the processor 23 may obtain the adjusted second transmission time T2' by subtracting the first time offset from the second transmission time T2. That is, the adjusted second transmission time T2' is the second transmission time T2 one first time offset earlier.

In this case, when the communication device 11 transmits the second data D1 at the second transmission time T2' according to an instruction by using the first scheduling channel F1, the scheduling server 20 may accurately receive the second data D2 at the predetermined time point. In other words, the above mechanism may allow the communication device 11 to be synchronized with the scheduling server 20, and collision is thereby prevented from occurring.

In different embodiments, the scheduling server 20 may directly inform the communication device 11 of the adjusted second transmission time T2' or may merely inform the communication device 11 of the first time offset, so as to allow the communication device 11 to calculate the adjusted second transmission time T2' according to the foregoing teachings by itself, but the disclosure is not limited thereto. After the second transmission time T2' is calculated, the processor 113 of the communication device 11 may control the transceiver 112 to transmit the second data D2 to the scheduling server 20 at the second transmission time T2' by using the first scheduling channel F1.

In addition, regarding the rest of the communication devices 12 to 1N, the scheduling server 20 may also assign scheduling channels and transmissions times to the communication devices 12 to 1N according to the foregoing teachings. Taking the communication device 12 as an example, the scheduling server 20 may control the communication device 12 to transmit data at a transmission time T3 by using the first scheduling channel F1, where the transmission time T3 is different from the first transmission time T1 and the second transmission times T2 and T2' corresponding to the communication device 11. In this case, even though the communication devices 11 and 12 both use the first scheduling channel F1 to transmit data, since the transmission times are different, data collision may not occur.

Taking the communication device 1N as an example, the scheduling server 20 may control the communication device 1N to transmit data at the first transmission time T1 by using a scheduling channel F2, where the scheduling channel F2 is different from the first scheduling channel F1 corresponding to the communication device 11. In this case, even though the communication devices 11 and 1N both transmit data at the first transmission time T1, since different scheduling channels are used, data collision may still not occur.

Further, the foregoing mechanism for achieving synchronization may be executed between the scheduling server 20 and the communication devices 12 to 1N, so that collision may not accidentally occur between the scheduling server 20 and the communication devices 12 to 1N caused by unsynchronization.

In an embodiment, the scheduling server 20 provided by the disclosure may configure one or a plurality of participation channels among the available channels, such that the communication devices 11 to 1N may be managed by the scheduling server 20. Taking the communication device 11 as an example, when the communication device 11 is intended to be managed by the scheduling server 20 (such as a boot process is justed competed), the communication device 11 may listen to whether the participation channel is being occupied by other communication devices first. If no is determined, the communication device 11 may send a registration request to the scheduling server 20 through the listened participation channel. On the other hand, if the listened participation channel is being occupied by other communication devices, the communication device 11 may wait until the participation channel is not occupied before trying to send the registration request to the scheduling server 20 through the participation channel, or alternatively, send the registration request to the scheduling server 20 by choosing another participation channel which is not occupied. After the scheduling server 20 accepts the registration request from the communication device 11, that is, the first transmission time T1, the second transmission time T2, and the first scheduling channel F1 may be correspondingly assigned to the communication device 11 as mentioned in the foregoing embodiments, such that the communication device 11 may transmit data to the scheduling server 20 through scheduling.

Further, in a conventional long range wide area network (LoRaWAN), since IoT devices participate in host management and transmit data through the same batch of channels, when trying to participate in the host management, the IoT devices may collide with other IoT devices that are sending data. Nevertheless, the scheduling server 20 provided by the disclosure separates the participation channel from the scheduling channel configured for data transmission, such that the probability of occurrence of the aforementioned data collision may be reduced.

In addition, in some embodiments, in order to allow each of the communication devices 11 to 1N to report a detected emergency event (e.g., fire) at real time, the scheduling server 20 provided by the disclosure may configure one or a plurality of emergency channels among the available channels and inform the communication devices 11 to 1N of these emergency channels. Taking the communication device 11 as an example, after accepting the registration request from the communication device 11, the scheduling server 20 may inform the communication device 11 of the emergency channel together with the first transmission time T1, the second transmission time T2, and the first scheduling channel F1. In this way, when detecting an emergency event, the communication device 11 may report the emergency event to the scheduling server 20 through the emergency channel in real time. In an embodiment, when intending to report an emergency event, the communication device 11 may try to perform transmission through each of the emergency channels in sequence or may randomly pick a channel for transmission among the emergency channels, but the disclosure is not limited thereto.

Based on the above, it can be seen that the available channels of the scheduling server 20 may generally be divided in to a scheduling channel type, a participation channel type, and an emergency channel type and the like, such that more flexible channel usage strategy is provided compared to that provided by the conventional LoRaWAN. Further, in different embodiments, the scheduling server 20 may dynamically adjust numbers of the scheduling channels, the participation channel, and the emergency channel according to a data report status of each of the managed communication devices 11 to 1N.

For instance, if the scheduling server 20 learns that the communication devices 11 to 1N report less emergency events based on mechanisms such as machine learning, the scheduling server 20 may correspondingly change part of the emergency channels into scheduling channels or participation channels. For another example, if the scheduling server 20 finds out that less registration requests are received, the scheduling server 20 may change part of the participation channels into the scheduling channels or the emergency channels. Alternatively, if the scheduling server 20 finds out that more emergency events are received during certain time periods, the scheduling server 20 may change part of the participation channels into the emergency channels during these time periods, but the disclosure is not limited thereto.

In different embodiments, the scheduling server 20 may also forward the above-mentioned information/signals through a gateway disposed between the scheduling server 20 and each of the communication devices 11 to 1N, but the disclosure is not limited thereto.

In some embodiments, since the scheduling server 20 has to manage a large number of communication devices, disadvantages such as lack of communication resources and difficult management may exist. Therefore, the scheduling server 20 may divide the managed communication devices into a plurality of groups and identify one leader device in each group, such that the leader device may assist the communication devices in the same group to transmit data to the scheduling server 20. Further description is provided together with FIG. 3.

Figure 3:
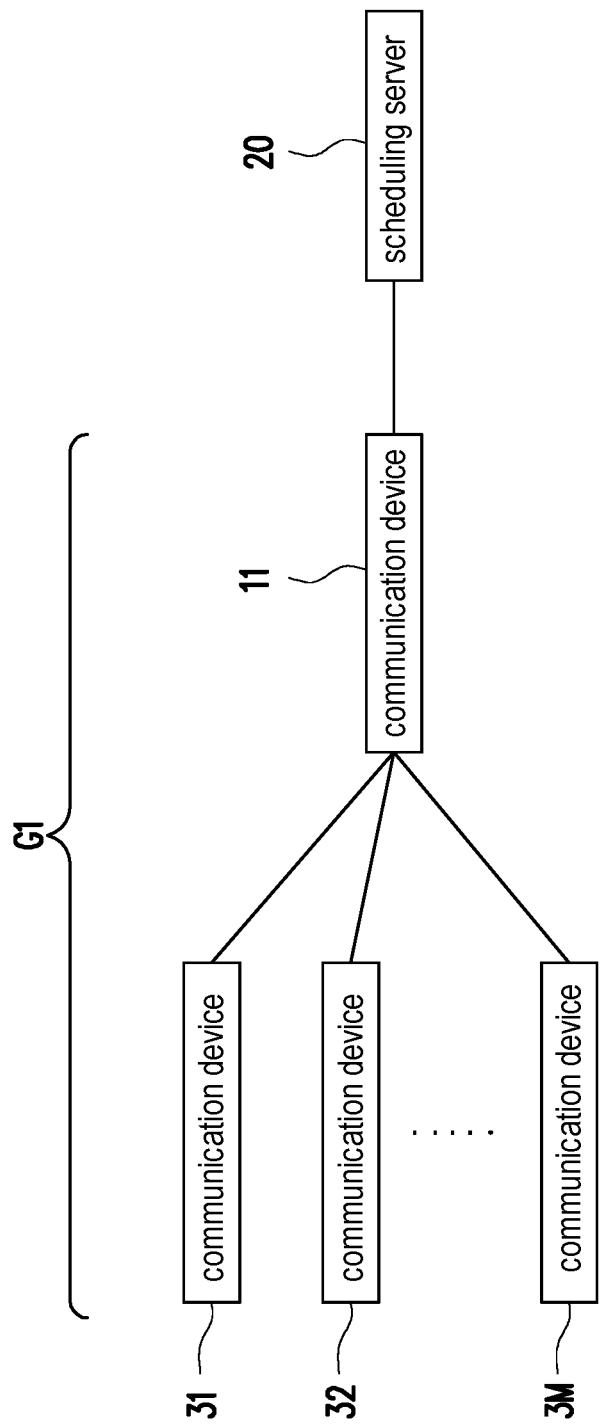
FIG. 3 is a schematic view illustrating division of the communication devices into groups according to an embodiment of the disclosure.

With reference to FIG. 3, which is a schematic view illustrating division of the communication devices into groups according to an embodiment of the disclosure. In this embodiment, the scheduling server 20 may treat, for example, communication devices 11, 31, 32, . . . , and 3M as one group G1, and the communication device 11 may be, for example, selected as the leader device in the group G1. In different embodiments, principles of selecting the leader device by the scheduling server 20 may be determined depends on the situation. For instance, in an embodiment, the scheduling server 20 may select the communication device with a maximum signal coverage range, providing favorable signal quality, or closest to the scheduling server 20 as the leader device of the group, but the disclosure is not limited thereto.

In an embodiment, after the communication device 11 is selected as the leader device of the group G1, the mechanism tough by FIG. 2 may be performed on the communication devices 31 to 3M, such that scheduling channels and transmission times are assigned to the communication devices 31 to 3M. Alternatively, the scheduling channels and the transmission times corresponding to the communication devices 11 and 31 to 3M may be uniformly arranged by the scheduling server 20, but the disclosure is not limited thereto.

Regarding the communication devices 31 to 3M, each of the devices may report a detected event and data to the communication device 11 (i.e., the leader device) through the assigned scheduling channel and the transmission time. Next, the communication device 11 may then report the data coming from the communication devices 31 to 3M to the scheduling server 20 through the assigned scheduling channel and the transmission time. For instance, if the first data D1 comes from the communication device 31, the communication device 11 may transmit the first data D1 to the scheduling server 20 at the first transmission time T1 by using the first scheduling channel F1, but the disclosure is not limited thereto.

In addition, in order to allow the communication devices 31 to 3M to conveniently report emergency events, when the communication devices 31 to 3M detect emergency events, the emergency events may be directly reported to the scheduling server 20 through the emergency channels configured by the scheduling server 20 without being forwarded by the communication device 11 (i.e., the leader device).

Figure 4:
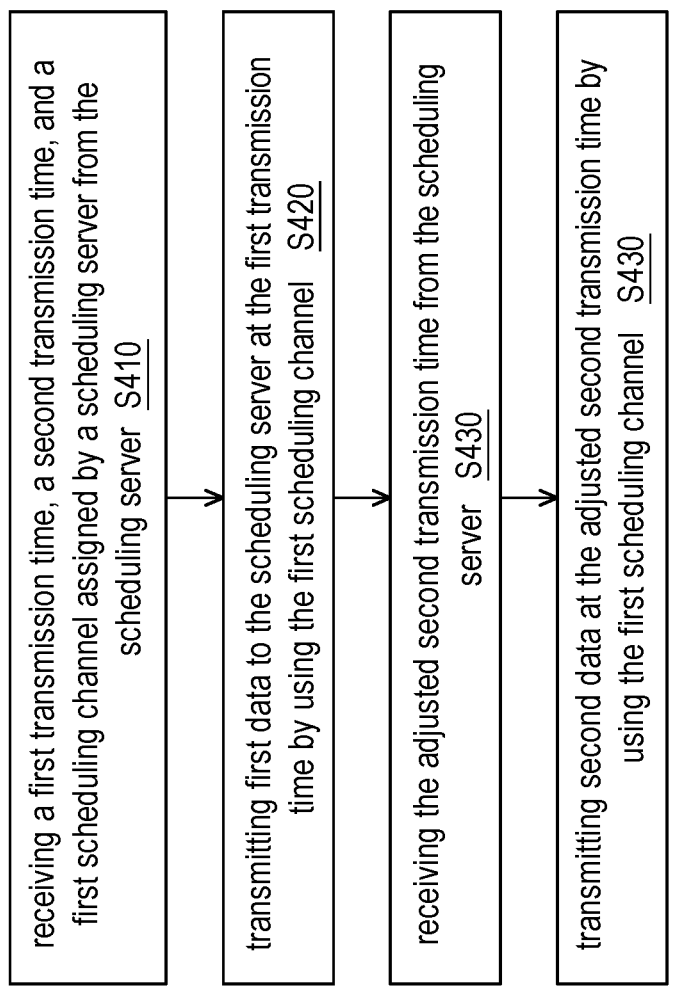
FIG. 4 is a flow chart illustrating a method for reporting data according to an embodiment of the disclosure.

With reference to FIG. 4, which is a flow chart illustrating a method for reporting data according to an embodiment of the disclosure. The method provided by this embodiment may be executed by the communication device 11 provided in FIG. 1, and description is provided together with the elements provided in FIG. 1.

First, in step S410, the processor 113 of the communication device 11 may receive the first transmission time T1, the second transmission time T2, and the first scheduling channel F1 assigned by the scheduling server 20 from the scheduling server 20. In step S420, the processor 113 may control the transceiver 112 to transmit the first data D1 to the scheduling server 20 at the first transmission time T1 by using the first scheduling channel F1. In step S430, the processor 113 may receive the adjusted second transmission time from the scheduling server 20. In step S440, the processor 113 may control the transceiver 112 to transmit the second data D2 at the adjusted second transmission time T2' by using the first scheduling channel F1. Details of the above steps may be found with reference to the description provided in the foregoing embodiments and thus are not repeated herein.

In view of the foregoing, the scheduling server provided by the disclosure assigns different scheduling channels and/or transmission times to different communication devices, such that data collision is prevented from occurring. Further, the scheduling server provided by the disclosure may control the communication devices to adjust the following transmission time according to the time offset of the received data, such that synchronization is achieved between the scheduling server and the communication devices, and collision is accurately prevented. In addition, as the available channels are divided into the scheduling channels, the participation channels, and the emergency channels, the scheduling server provided by the disclosure may flexibly arrange and assign channels to the communication devices.

Besides, the communication devices provided by the disclosure may be divided into different groups, one leader device is selected in each group, and the leader device is configured to act as a medium for forwarding the data provided by other members of the same group to the scheduling server. Accordingly, the scheduling server may conveniently manage the communication devices, and the communication resources may be used effectively.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A communication device scheduling method, suitable for a scheduling server for managing a plurality of communication devices, the method comprising:
   assigning a first transmission time, a second transmission time, and a first scheduling channel to a first communication device among the communication devices to control the first communication device to respectively transmit first data and second data at the first transmission time and the second transmission time by using the first scheduling channel;
   in response to receiving the first data at a first receiving time, calculating a first time offset according to the first receiving time; and
   adjusting the second transmission time based on the first time offset to control the first communication device to transmit the second data by using the first scheduling channel at the adjusted second transmission time.

2. The method according to claim 1, further comprising:
   assigning a third transmission time and the first scheduling channel to a second communication device among the communication devices to control the second communication device to transmit third data at the third transmission time by using the first scheduling channel, wherein the third transmission time is different from the first transmission time or the second transmission time.

3. The method according to claim 1, further comprising:
   assigning the first transmission time and a second scheduling channel to a third communication device among the communication devices to control the third communication device to transmit fourth data at the first transmission time by using the second scheduling channel, wherein the second scheduling channel is different from the first scheduling channel.

4. The method according to claim 1, wherein the scheduling server has a plurality of available channels, and before the step of assigning the first transmission time, the second transmission time, and the first scheduling channel to the first communication device among the communication devices, the method further comprises:
   configuring at least one participation channel among the available channels;
   receiving a registration request of the first communication device through the at least one participation channel;
   assigning the first transmission time, the second transmission time, and the first scheduling channel to the first communication device in response to the registration request.

5. The method according to claim 4, further comprising:
   configuring at least one emergency channel among the available channels and informing the first communication device of the at least one emergency channel to allow the first communication device to report an emergency event through the at least one emergency channel.

6. The method according to claim 5, wherein the available channels further comprise a plurality of scheduling channels, the first scheduling channel is comprised in the scheduling channels, and the method further comprises:
   dynamically adjusting numbers of the scheduling channels, the at least one participation channel, and the at least one emergency channel according to a data report status of each of the communication devices managed by the scheduling server.

7. The method according to claim 1, wherein the communication devices are divided into a plurality of groups, the first communication device is a group leader of a first group among the groups, and the method further comprises:
   receiving data transmitted back by other communication devices in the first group through the first communication device.

8. The method according to claim 7, wherein the first communication device has a maximum signal coverage range in the first group.

9. The method according to claim 7, wherein the scheduling server has a plurality of available channels, and the method further comprises:
   configuring at least one emergency channel among the available channels and informing the first group of the at least one emergency channel to allow each of the communication devices in the first group to directly report an emergency event through the at least one emergency channel.

10. A scheduling server, comprising:
    a storage circuit, storing a plurality of modules;
    a transceiver;
    a processor, coupled to the storage circuit and the transceiver, accessing the modules to execute the following steps:
    controlling the transceiver to assign a first transmission time, a second transmission time, and a first scheduling channel to a first communication device among the communication devices to control the first communication device to respectively transmit first data and second data at the first transmission time and the second transmission time by using the first scheduling channel;
    in response to the transceiver receiving the first data at a first receiving time, obtaining a first time offset between the first receiving time and the first transmission time; and
    adjusting the second transmission time based on the first time offset and controlling the transceiver to request the first communication device to transmit the second data by using the first scheduling channel at the adjusted second transmission time.

11. A method for reporting data, suitable for a communication device managed by a scheduling server, the method comprising:
    receiving a first transmission time, a second transmission time, and a first scheduling channel assigned by the scheduling server from the scheduling server;
    transmitting first data to the scheduling server at the first transmission time by using the first scheduling channel;

receiving the adjusted second transmission time from the scheduling server; and transmitting second data at the adjusted second transmission time by using the first scheduling channel.

12. The method according to claim 11, wherein before the step of receiving the first transmission time, the second transmission time, and the first scheduling channel assigned by the scheduling server from the scheduling server, the method further comprises:

listening to whether at least one participation channel configured by the scheduling server is occupied;

sending a registration request to the scheduling server through the at least one participation channel in response to the at least one participation channel not being occupied;

receiving the first transmission time, the second transmission time, and the first scheduling channel assigned by the scheduling server from the scheduling server in response to the registration request being accepted.

13. The method according to claim 11, further comprising:

in response to an emergency event, reporting the emergency event through at least one emergency channel configured by the scheduling server.

14. The method according to claim 11, wherein the communication device is a leader device of a first group managed by the scheduling server, and the method further comprises:

receiving the first data from another communication device in the first group and transmitting first data to the scheduling server at the first transmission time by using the first scheduling channel.

15. The method according to claim 14, wherein before the step of receiving the first data from another communication device in the first group, the method further comprises:

assigning a third transmission time and a second scheduling channel to the another communication device to control the another communication device to transmit the first data at the third transmission time by using the second scheduling channel.

16. A communication device, comprising:

a storage circuit, storing a plurality of modules;

a transceiver;

a processor, coupled to the storage circuit and the transceiver, accessing the modules to execute the following steps:

receiving a first transmission time, a second transmission time, and a first scheduling channel assigned by a scheduling server from the scheduling server;

controlling the transceiver to transmit first data to the scheduling server at the first transmission time by using the first scheduling channel;

receiving the adjusted second transmission time from the scheduling server; and controlling the transceiver to transmit second data at the adjusted second transmission time by using the first scheduling channel.

* * * * *